(12) United States Patent
Ang

(10) Patent No.: US 12,079,736 B2
(45) Date of Patent: Sep. 3, 2024

(54) PREDICTING WEB APPLICATION PROGRAMMING INTERFACE CALL OPERATIONS USING MACHINE LEARNING TECHNIQUES

(71) Applicant: Dell Products L.P., Round Rock, TX (US)

(72) Inventor: Tien Sung Ang, Kuala Lumpur (MY)

(73) Assignee: Dell Products L.P., Round Rock, TX (US)

( * ) Notice: Subject to any disclaimer, the term of this patent is extended or adjusted under 35 U.S.C. 154(b) by 430 days.

(21) Appl. No.: 16/911,512

(22) Filed: Jun. 25, 2020

(65) Prior Publication Data

US 2021/0406711 A1  Dec. 30, 2021

(51) Int. Cl.
*G06N 5/04* (2023.01)
*G06F 9/54* (2006.01)
*G06N 20/00* (2019.01)

(52) U.S. Cl.
CPC .............. *G06N 5/04* (2013.01); *G06F 9/547* (2013.01); *G06N 20/00* (2019.01)

(58) Field of Classification Search
CPC ........... G06N 5/04; G06N 20/00; G06F 9/547
See application file for complete search history.

(56) References Cited

U.S. PATENT DOCUMENTS

| | | | |
|---|---|---|---|
| 10,489,504 B2 | 11/2019 | Wetzel et al. | |
| 10,635,505 B2 | 4/2020 | Chen et al. | |
| 11,320,588 B1 * | 5/2022 | Mazed | G16H 40/63 |
| 11,443,102 B1 * | 9/2022 | Wilson | G06Q 30/04 |
| 2013/0226837 A1 * | 8/2013 | Lymberopoulos | G06F 16/9574 706/12 |
| 2014/0376543 A1 * | 12/2014 | Malatack | H04L 65/1059 370/352 |
| 2018/0176318 A1 | 6/2018 | Rathod | |
| 2018/0275881 A1 | 9/2018 | Ashraf et al. | |

(Continued)

FOREIGN PATENT DOCUMENTS

WO   WO-2021145862 A1 *  7/2021

OTHER PUBLICATIONS

Lanxuan Tong, Jian Cao, Qing Qi, Shiyou Qian; Aims: A Predictive Web API Invocation Behavior Monitoring System; Aug. 29, 2019; 10 pages (Year: 2019).*

(Continued)

*Primary Examiner* — Kevin L Young
*Assistant Examiner* — Kimberly L Jordan
(74) *Attorney, Agent, or Firm* — Ryan, Mason & Lewis, LLP

(57) ABSTRACT

Methods, apparatus, and processor-readable storage media for predicting web API call operations using machine learning techniques are provided herein. An example computer-implemented method includes obtaining input data pertaining to one or more operations within one or more web application programming interface calls; predicting at least one operation to be requested in a given web application programming interface call by processing the input data and data pertaining to the given web application programming interface call using one or more machine learning techniques; and performing at least one automated action based at least in part on the at least one predicted operation.

20 Claims, 7 Drawing Sheets

(56) References Cited

U.S. PATENT DOCUMENTS

| | | |
|---|---|---|
| 2020/0007531 A1 | 1/2020 | Koottayi et al. |
| 2022/0060771 A1* | 2/2022 | Choi ...................... H04L 63/18 |
| 2022/0123934 A1* | 4/2022 | Chen .................... H04L 9/3213 |
| 2023/0409714 A1* | 12/2023 | Chen ........................ G06N 5/01 |

OTHER PUBLICATIONS

Yiu, T., Understanding Random Forest, Towards Data Science, Jun. 12, 2019.

* cited by examiner

PREDICTING WEB APPLICATION PROGRAMMING INTERFACE CALL OPERATIONS USING MACHINE LEARNING TECHNIQUES

FIELD

The field relates generally to information processing systems, and more particularly to web application programming interface (API) calls using such systems.

BACKGROUND

Performance on web API calls is commonly problematic, particularly in electronic commerce (e-commerce) contexts. Users typically want real-time responses when requesting operations in connection with such calls, and often abandon calls if the responses are not sufficiently fast. However, conventional web API call techniques generally require a message bus and/or a message queue to carry out an operation on a separate workflow, wherein the client informs the application that a certain computation is required, thereby creating latency in the web API call.

SUMMARY

Illustrative embodiments of the disclosure provide techniques for predicting web API call operations using machine learning techniques. An exemplary computer-implemented method includes obtaining input data pertaining to one or more operations within one or more web application programming interface calls, predicting at least one operation to be requested in a given web application programming interface call by processing the input data and data pertaining to the given web application programming interface call using one or more machine learning techniques, and performing at least one automated action based at least in part on the at least one predicted operation.

Illustrative embodiments can provide significant advantages relative to conventional web API call techniques. For example, problems associated with latency are overcome in one or more embodiments through preemptively predicting at least one operation to be requested in a given web API call using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
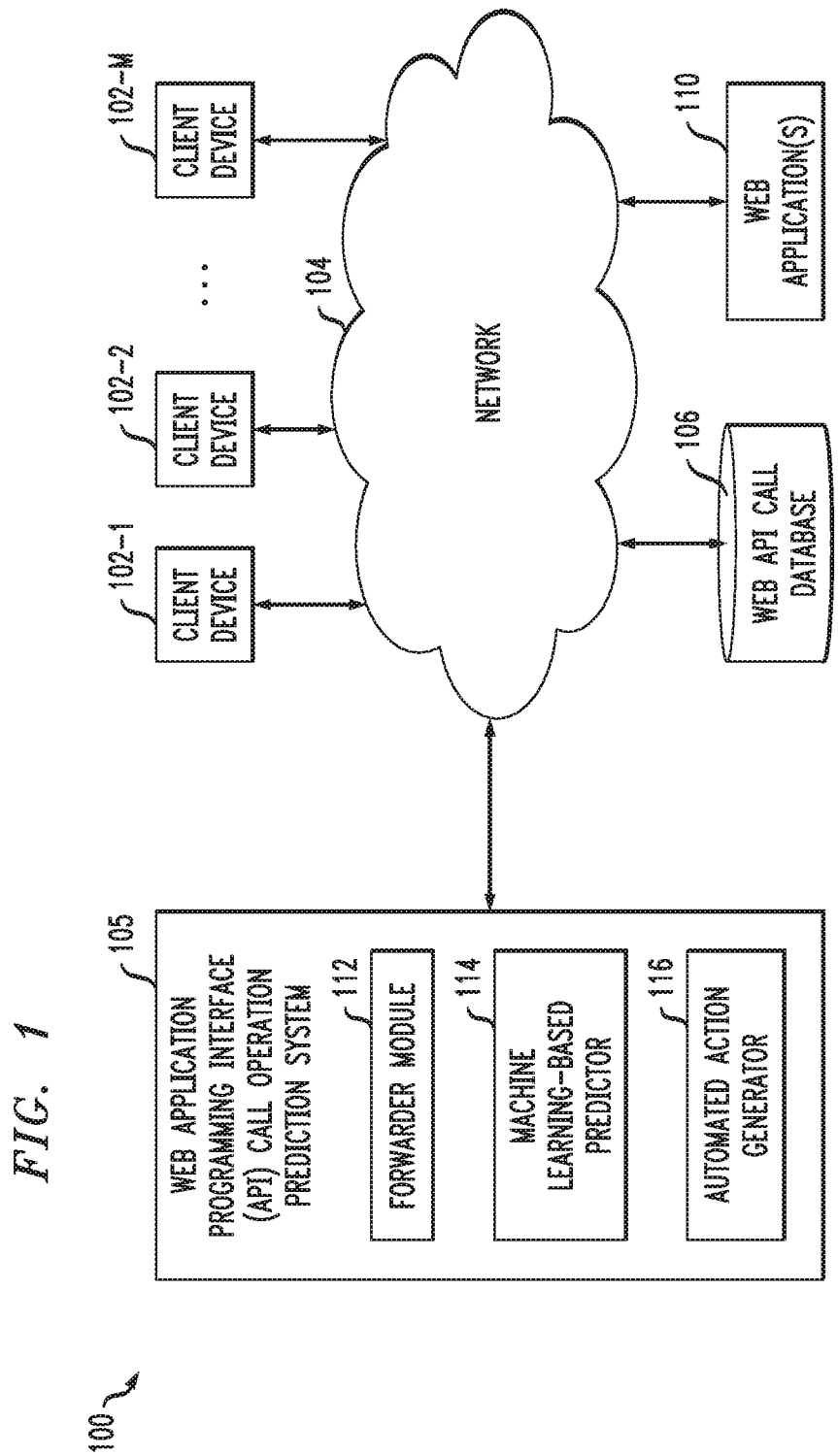
FIG. 1 shows an information processing system configured for predicting web API call operations using machine learning techniques in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is web API call operation prediction system 105 and one or more web applications 110 (e.g., quote generation applications, pricing applications, transaction applications, etc.).

The client devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the web API call operation prediction system 105 can have an associated database 106 configured to store data pertaining to web API calls, which comprise, for example, forwarder data, machine learning-trained data, etc. Also, in at least one embodiment, an example client device 102 can have an associated database configured to store data pertaining to transaction information (such as detailed, for example, in FIG. 2).

The database 106 in the present embodiment is implemented using one or more storage systems associated with the web API call operation prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the web API call operation prediction system 105 can be one or more input-output devices, which illustratively comprise keyboards, displays or other types of input-output devices in any combination. Such input-output devices can be used, for example, to support one or more user interfaces to the web API call operation prediction system 105, as well as to support communication between the web API call operation prediction system 105 and other related systems and devices not explicitly shown.

Additionally, the web API call operation prediction system 105 in the FIG. 1 embodiment is assumed to be implemented using at least one processing device. Each such processing device generally comprises at least one processor and an associated memory, and implements one or more functional modules for controlling certain features of the web API call operation prediction system 105.

More particularly, the web API call operation prediction system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the web API call operation prediction system 105 to communicate over the network 104 with the client devices 102, and illustratively comprises one or more conventional transceivers.

The web API call operation prediction system 105 further comprises a forwarder module 112, a machine learning-based predictor 114, and an automated action generator 116.

It is to be appreciated that this particular arrangement of modules 112, 114 and 116 illustrated in the web API call operation prediction system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for predicting web API call operations using machine learning techniques involving client devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example web API call operation prediction system 105 in computer network 100 will be described in more detail with reference to the flow diagram of FIG. 6.

At least one embodiment includes predicting one or more web API call operations of a resource identifier (ID) under the condition that the resource ID does not change during the web API call. For example, consider a scenario wherein a client calls a price calculation without changing the contents of the quote data after a certain sequence of web API call operations. In such an embodiment, the resource ID encompasses a data representation such as, by way merely of example, /customers/{customerId}, wherein {customerId} is the resource ID. Accordingly, the resource ID is associated with the transaction that occurs from a web application, and such a representation is typically not visible to the user. Additionally, in at least one embodiment, a user may generate several resources from various microservices, wherein each microservice (e.g., including a representational state transfer (RESTful) API) would have its own resource ID.

Also, one or more embodiments include generating a web API call operation prediction based at least in part on historical data using machine learning techniques. Such an embodiment includes training at least one machine learning model by processing one or more sets of sequences of call operations based, for instance, on the operation type, the time-stamp to identify the sequence if it is called from and/or to a server farm, and the client ID. By observing historical sequences of call operations, the trained machine learning model can generate correlations to given processes and/or operations (e.g., pricing) in ongoing web API calls.

Using pricing as an example operation, at least one embodiment includes precomputing a predicted pricing result (e.g., for a pricing operation predicted by at least one machine learning model) ahead of the client calling for the pricing operation. After which, if the client calls the pricing operation, the precomputed result is retrieved from a predictor database and returned to the caller. If there are no prediction results, such an embodiment can include commencing a conventional path to call the operation.

One or more embodiments also include learning (e.g., training at least one machine learning model) from different clients and/or client devices based on caller IDs and/or client IDs. Such an embodiment includes facilitating a predictor to handle web applications that interact with different applications. For example, consider an application such as a quote generation application, which may interact with different applications associated with different enterprises and/or client devices in order to carry out quote generation functions.

Additionally or alternatively, in at least one embodiment, operation predictions are not used beyond a given expiration time, so as to remain relevant in the case of data used in the computation(s) potentially becoming invalid and/or outdated, taxation and/or interlocks that may have changing values due to configuration changes, etc. As used herein, interlocks refer to how static or dynamic particular data are. By way merely of example, consider price information. The price of an item may change and can be volatile based, for instance, on the published prices set by sales. By way of illustration, if a quote has an item priced at $100, and the quote is left (that is, is not updated) for a long period of time, during which the price changes, then a corresponding price call would not be valid and/or may impact final price calculations.

Figure 2:
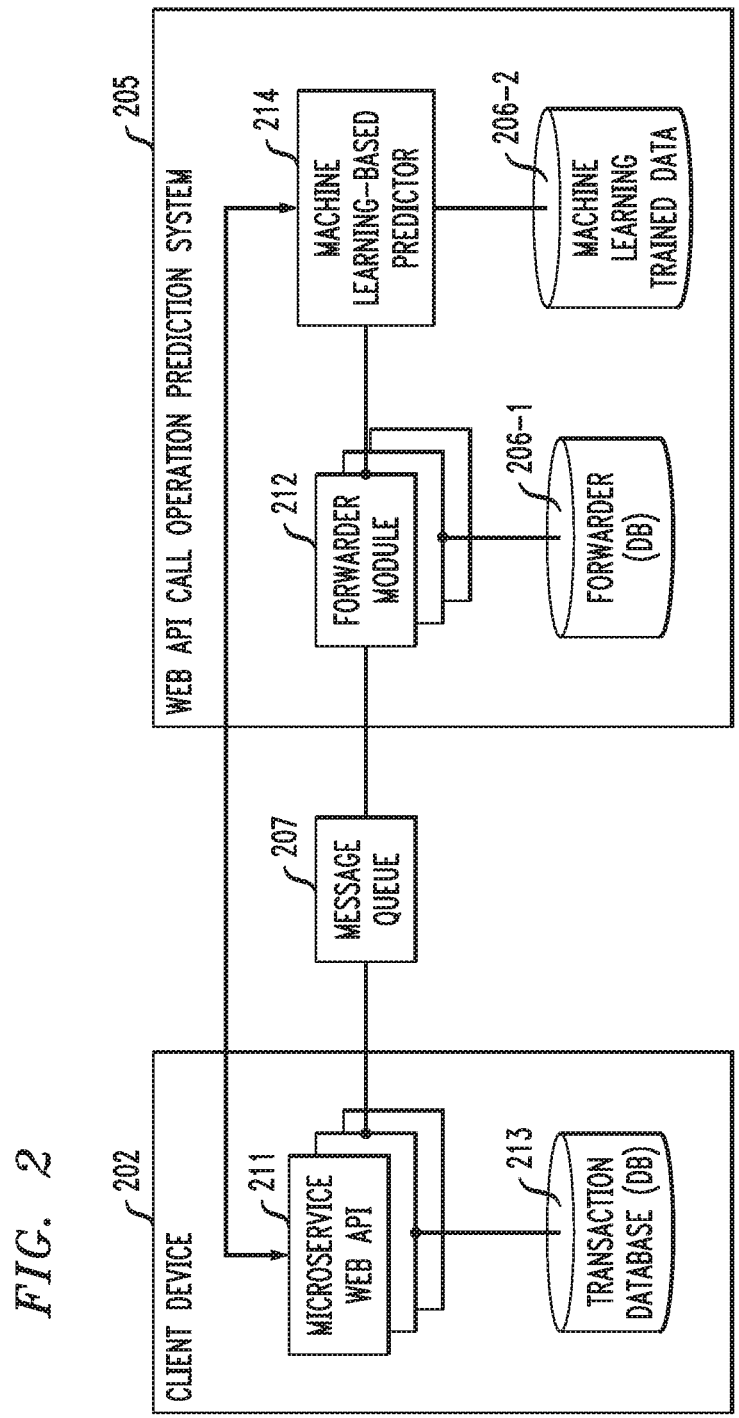
FIG. 2 shows an information processing system configured for predicting and precomputing web API call operations using machine learning techniques in an illustrative embodiment.

FIG. 2 shows an information processing system configured for predicting and precomputing web API call operations using machine learning techniques in an illustrative embodiment. By way of illustration, FIG. 2 depicts client device 202, message queue 207, and web API call operation prediction system 205. As illustrated in FIG. 2, client device 202 includes microservice web API 211 and transaction database 213. Additionally, web API call operation prediction system 205 includes forwarder module 212 (connected to forwarder database 206-1) and machine learning-based predictor 214 (connected to a database containing machine learning trained data 206-2).

More specifically, at least one microservice sends, via web API 211, at least one notification with information, pertaining to at least one transaction, to message queue 207 (which represents, for example, some form of a feeder). The forwarder module 212 polls the status of the message queue 207, and fetches the transaction-related information. Also, the forwarder module 212 curates the fetched information and transforms the information into one or more formats needed for generating a prediction. The forwarder module 212 then updates the record of the transaction, based on the resource ID, in the forwarder database 206-1. The resulting record is sent to the machine learning-based predictor 214 to predict the next action. The machine learning-based predictor 214 returns a result and, if the result shows that a certain action is to be performed, sends a call to an internal method at the client device microservice API 211 to internally precompute the corresponding operation(s). In one or more embodiments, such actions detailed above are performed ahead of an actual call to the microservice by the user.

Figure 3:
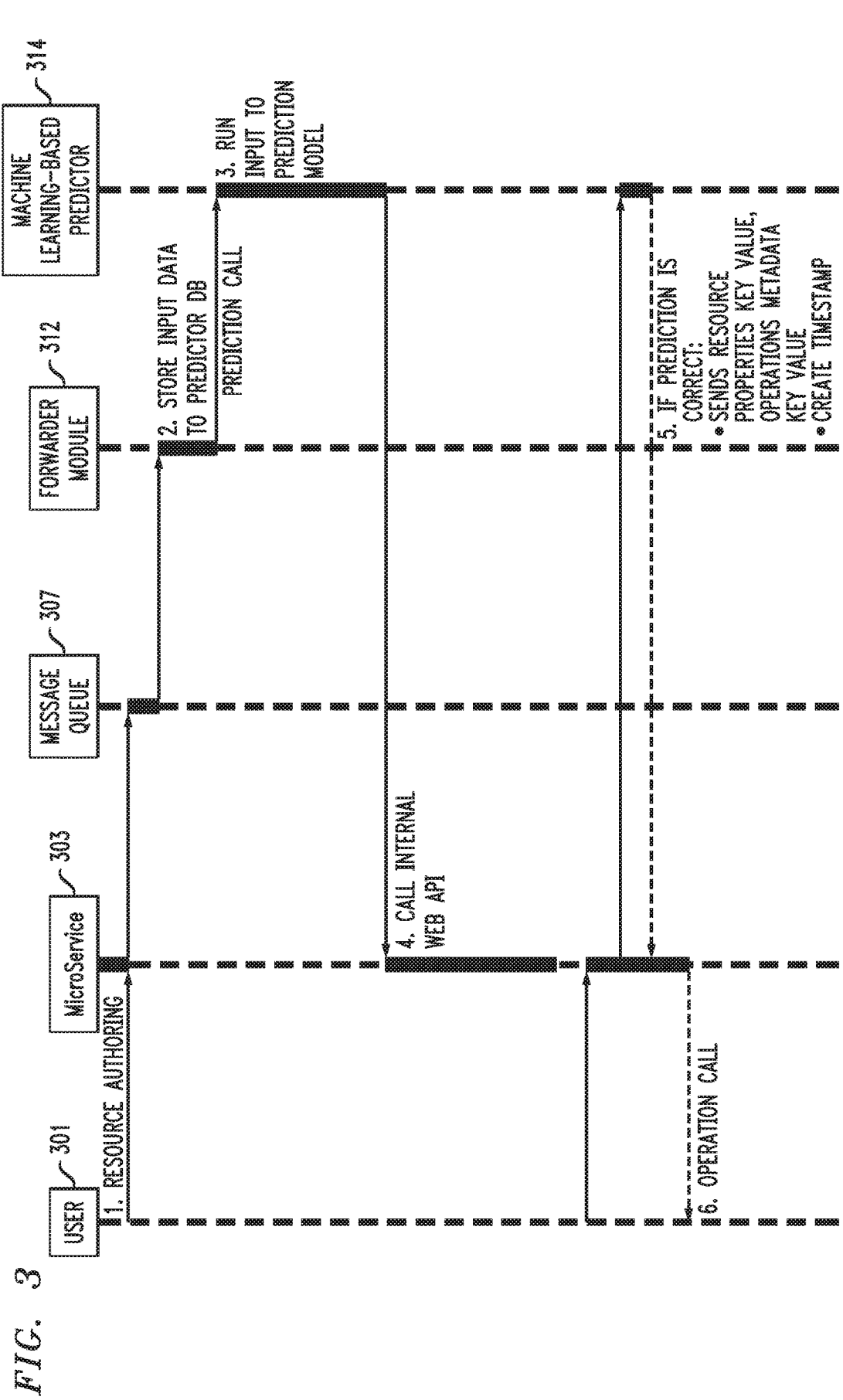
FIG. 3 shows an example workflow for predicting and precomputing web API call operations using machine learning techniques in an illustrative embodiment.

FIG. 3 shows an example workflow for predicting and precomputing web API call operations using machine learning techniques in an illustrative embodiment. Specifically, FIG. 3 depicts multiple steps across user 301, microservice 303, message queue 307, forwarder module 312, and machine learning-based predictor 314. Step 1 includes resource authoring (e.g., quote creation, adding one or more items to a virtual shopping cart, etc.) from user 301 via microservice 303 to message queue 307, and subsequently forwarder module 312. A resource authoring message can include, for example, a resource property key value, a message creation timestamp, and an operation metadata key-value pair. In one or more embodiments, the message creation timestamp can be used to log the published event, which can be later used to sequence a flow of events at the forwarder module 312.

Step 2 includes storing the input data (e.g., the resource authoring message) in at least one predictor database (e.g., database 106 or database 206-2), and sending a prediction call to the machine learning-based predictor 314. Step 3 includes processing at least a portion of the input data using a machine learning-based prediction model of the machine learning-based predictor 314. If the model returns a classification result of an operation such as a pricing operation, for example, the machine learning-based predictor 314 will facilitate performance of the operation by calling an internal route at the microservice 303.

Accordingly, step 4 includes calling an internal web API endpoint to compute the predicted operation (e.g., a pricing operation, as noted in the above example). An internal route stores the transient result of the computation in its resource container at the microservice 303, and the resource is updated with the computed resources (e.g., a price summary).

In step 5, the microservice 303 polls the machine learning-based predictor 314 on whether the computation associated with the prediction is correct. If yes (that is, the computation associated with the prediction is correct), the machine learning-based predictor 314 sends the microservice 303 a resource property key value as well as an operation metadata key value. In one or more embodiments, property key values and operation metadata key values might include, by way merely of example, the following: {resourceId: Value; httpMethod: Value (POST, PUT, DELETE); MethodCall: Value (Price, Refresh, . . . ); ETag: Value (a hashed value in hex); creationTime: Value (time_format)}. Also, the machine learning-based predictor 314 generates and sends to the microservice 303 a timestamp associated with the confirmed computation associated with the prediction.

Step 6 includes outputting the operation call (e.g., a price call) to the user 301. In one or more embodiments, the transient data storing result is used, returning results of the precomputed operation (from the microservice 303). This prevents the blocking call from conducting an expensive operation which could negatively impact usability and/or the user experience associated with the web API call.

As illustrated in FIG. 3 and further detailed herein, one or more embodiments include predicting the calls of microservice operations to preempt the computation of necessary and/or related resources at the backend. Such microservice operation calls can include, for example, web API service calls that perform computations and/or data processing. Predicted operations and/or related precomputations can be published by one or more client devices, and can be subscribed by one or more forwarders. Forwarders can use the message timestamp (e.g., the message containing a predicted operation and/or related precomputation) to predetermine the order of the web API call sequencing that can be used for multiple predictions. Additionally, in at least one embodiment, forwarders store a row and/or record for every unique RESTful web API resource ID (e.g., quote ID, quote number, etc.). Also, in such an embodiment, each transaction is mapped to a key-value paired JavaScript object notation (JSON) document that is stored in the forwarder database as a single record. Each such record holds historical data of one or more web API calls.

Figure 4:
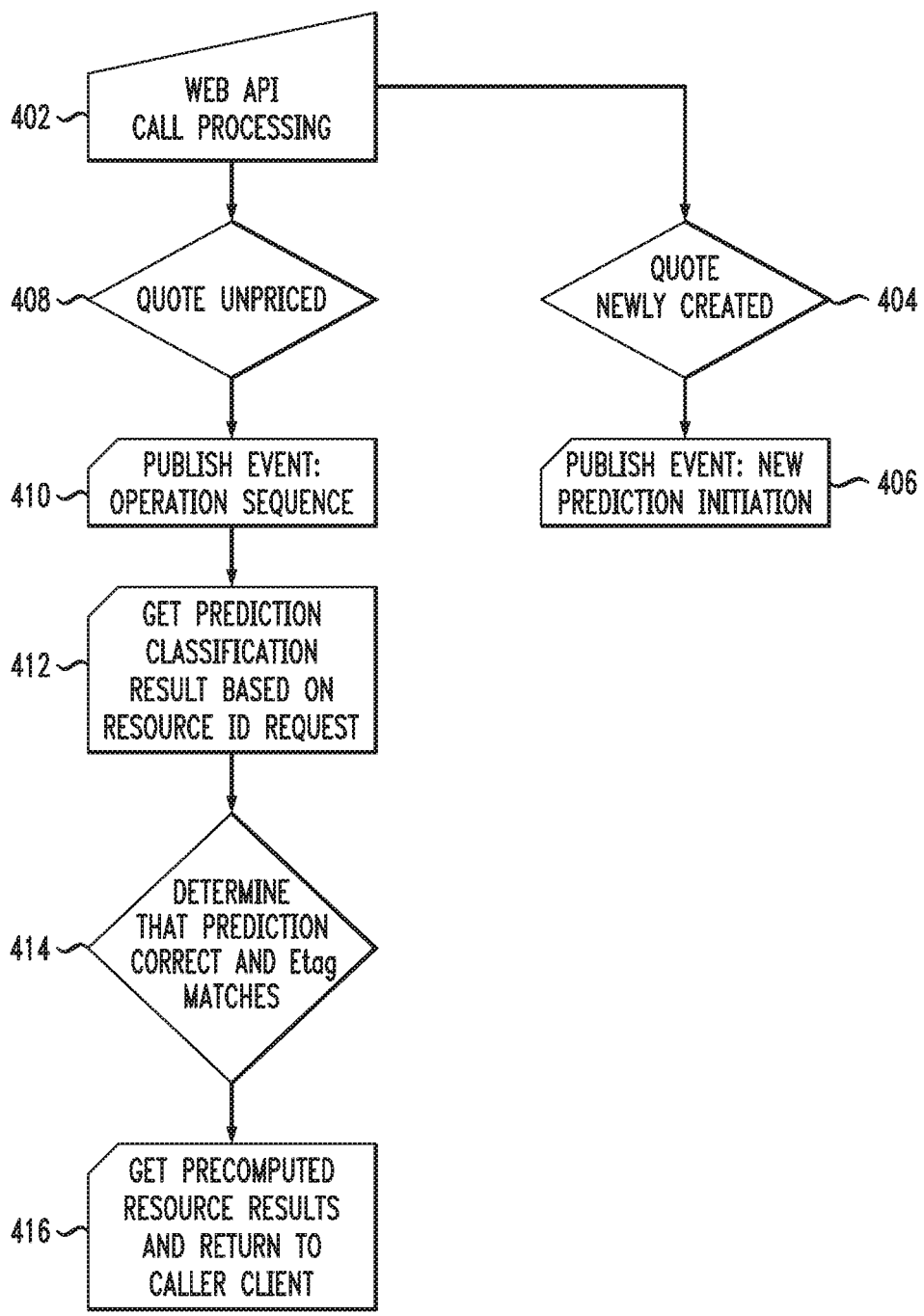
FIG. 4 shows an example workflow for predicting web API call operations using machine learning techniques in an illustrative embodiment.

FIG. 4 shows an example workflow for predicting web API call operations using machine learning techniques in an illustrative embodiment. Step 402 includes processing a web API call and identifying a call operation (e.g., a price or refresh call operation, or other operation to update a resource). In step 404, a quote corresponding to the call operation is to be newly created, and in step 406, a new prediction initiation event is published. Additionally or alternatively, in one or more embodiments, if a call is occurring, for example, on a POST to create a new resource (e.g., a new quote), then step 404 can also include sending a notification indicating the beginning of a prediction process.

In step 408, a quote corresponding to the call operation (e.g., the price or refresh operation) is determined to be unpriced. In at least one example embodiment, predictions need only be generated in connection with a resource or quote that is still in draft mode or is being edited. After the resource is quoted and priced, the prediction, in such an example embodiment, is no longer required. Accordingly, in such an example embodiment, step 408 can include checking to determine if the quote is still in draft mode and if an active price call is occurring.

Step 410 includes publishing an operation sequence event, and step 412 includes determining a prediction classification result based at least in part on a resource ID (also referred to herein as an entity tag (ETag) request). As used herein, an ETag facilitates a determination of whether the corresponding resource has not been altered in terms of contents before the current request. One or more embodiments includes attempting to match a given ETag to the precomputed resource of a prior corresponding ETag. In such an embodiment, an ETag changes only if the document resource has been modified after the prediction engine and/or prediction model runs the given computed resource.

Referring again to FIG. 4, step 414 includes determining if the prediction is correct and the ETag matches the precomputed resource of the prior corresponding ETag. If the prediction is correct and the ETag matches, then step 416 includes obtaining the precomputed resource results and returning the same to the caller client.

In accordance with FIG. 4, one or more embodiments include publishing an event to a forwarder and determining, in connection with a machine learning-based predictor, if the resource in question has been previously precomputed. If yes (i.e., the resource in question has been previously precomputed), such an embodiment includes checking to determine if the ETag of the returned result from the prediction data (stored in the a database, for example) matches the current ETag of a current quote. If the ETag matches, then the quote is valid, and the quote's corresponding prediction result can be used.

As detailed herein, at least one embodiment includes utilizing and/or implementing one or more machine learning supervised learning classification models and/or algorithms. Such machine learning models and/or algorithms can include, for example, one or more random forest classification algorithms and/or one or more Gaussian naïve Bayes classifiers. In such an embodiment, one or more of the machine learning algorithms can include the following steps:

1. Parse incoming data, curate the data, and transform the data to a single record with a key-value or a dictionary-type format. For example, such a format of data corresponding to extractions from a quote document can include the following: {"region": "US", "quoteID": 11222, httpMethodCall:"POST", APICallMethod: "Price", timestamp:"date", "sourceAppName":"DSP", "ClientId":"2222" . . . }.
2. If the resourceID is new, create a new record in the forwarder database, and add the value of httpMethodCall concatenate with APICallMethod to the key of "operatingSequence1."
3. If the resourceID is not new, append the new value to "operatingSequenceN+1" (depending on how many entries are already present).
4. The entire record is then sent to a machine learning model (written, for example, in Python). For instance, if a random forest classification is used, then the result=ML_Model(input_record).
5. The result will be an enumeration of either price or no price if it is a single classification. The result will be an enumeration of price and refresh for a binary classification.
6. The machine learning model can be trained with a sample of supervised data.

In one or more embodiments, such machine learning models and/or algorithms can be trained using machine data logs. Such logs can include data entries from various applications. Internet Information Services (IIS) logs, for example, store all exceptions or errors thrown by an application during real-time operations. Applications are also able to generate customized logs to a local folder in a virtual machine and/or physical machine. Additionally or alternatively, logs can record all hypertext transfer protocol (HTTP) traffic calls occurring between a client and a microservice. Further, at least one embodiment includes generating and/or implementing a script to process logs of an application, and generate sample test data with the known results. Such actions could be carried out, for example, in connection with supervised classification data preparations.

Also, in such an embodiment, machine learning features for such models and/or algorithms can be determined and/or organized via an N-dimension feature matrix. For example, such features can include the amount of time between calls of one or more web API methods, user click interactions that are translated to web API calls, enterprise and/or business segments involved in web API calls, user type of interrupt service routine (ISR) and/or terminate and stay resident (TSR) method, etc.

Figure 5:
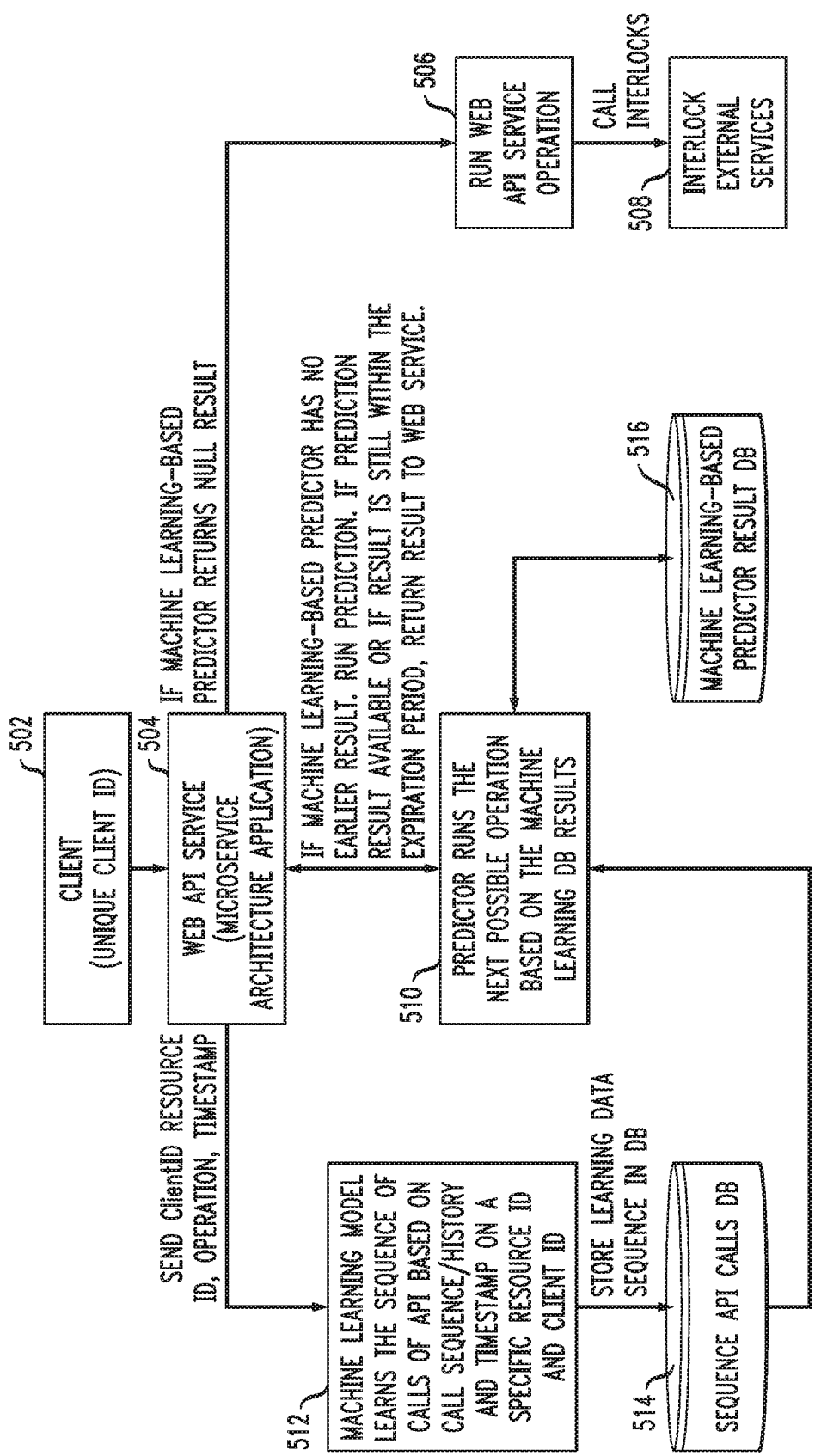
FIG. 5 shows an example workflow for predicting and precomputing web API call operations using machine learning techniques in an illustrative embodiment.

FIG. 5 shows an example workflow for predicting and precomputing web API call operations using machine learning techniques in an illustrative embodiment. By way of illustration, FIG. 5 depicts a client 502 (represented by a unique client ID), which interacts (within the context of a web API call) with a web API service 504 (e.g., a microservice architecture application). In connection with that interaction, if a machine learning-based predictor returns a null result for a given web API call operation, then step 506 includes running the given web API call operation, and step 508 includes interlocking one or more relevant external services.

Also in connection with the above-noted interaction, web API service 504 checks with the machine learning-based predictor 510 to determine if a prediction result is available. If a result is available, one or more embodiments include determining whether the expiration date associated with the prediction has been adhere to, and if yes, further analyzing the relevant ETag to ensure that the document and/or prediction is valid. In such an embodiment, the result is then returned to the web API service 504 (and/or the client 502).

As also illustrated in FIG. 5, the web API service 504 sends data (e.g., client ID, resource ID, operation-related data, a timestamp, etc.) corresponding to the interaction with the client 502 to at least one machine learning model and/or algorithm. Accordingly, step 512 includes learning, via at least one machine learning model and/or algorithm, the sequence of call operations for the given web API call based at least in part on the provided data. The learned sequence and/or related data are stored in a database 514 (e.g., a web API call operation sequence database) and also provided to the predictor in connection with step 510.

Accordingly, in at least one embodiment, step 510 includes determining and/or running, via the predictor, the next possible operation based on relevant machine learning prediction results. Such results are then stored in a database 516 (e.g., a machine learning-based predictor results database).

As detailed herein, one or more example embodiments include predicting, via a trained machine learning model, web API call operations that are influenced by the clicks and/or other actions of the users/clients of the web API. In such an embodiment, expensive and/or time-intensive API call operations can be precomputed (in a preemptive way) based on predictions generated by the machine learning model.

Figure 6:
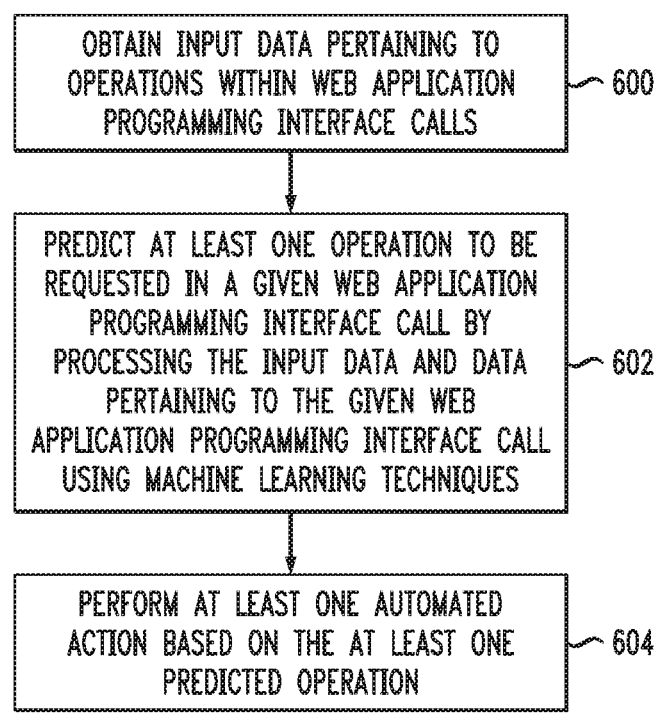
FIG. 6 is a flow diagram of a process for predicting web API call operations using machine learning techniques in an illustrative embodiment.

FIG. 6 is a flow diagram of a process for predicting web API call operations using machine learning techniques in an illustrative embodiment. It is to be understood that this particular process is only an example, and additional or alternative processes can be carried out in other embodiments.

In this embodiment, the process includes steps 600 through 604. These steps are assumed to be performed by the web API call operation prediction system 105 utilizing its modules 112, 114 and 116.

Step 600 includes obtaining input data pertaining to one or more operations within one or more web application programming interface calls. In at least one embodiment, the input data can include historical data pertaining to sequences of operation calls within the one or more web application programming interface calls. In such an embodiment, the historical data can include information pertaining to at least one of operation types, timestamps, user identifiers, and resource identifiers.

Step 602 includes predicting at least one operation to be requested in a given web application programming interface call by processing the input data and data pertaining to the given web application programming interface call using one or more machine learning techniques. In at least one embodiment, the one or more machine learning techniques include one or more supervised learning classification algorithms such as, for example, at least one random forest algorithm and/or at least one Gaussian naïve Bayes algorithm. Additionally or alternatively, one or more embodiments include training the one or more machine learning techniques using machine data logs. In such an embodiment, training can include organizing machine learning features using an N-dimension feature matrix, wherein the machine learning features include, for example, time between operations in web application programming interface calls, user click interactions that are translated to web application programming interface call operation requests, user information, and/or application information.

Step 604 includes performing at least one automated action based at least in part on the at least one predicted operation. In at least one embodiment, performing the at least one automated action includes outputting an instruction to at least one microservice application to perform one or more preemptive computations pertaining to the at least one predicted operation. Such an embodiment can also include instructing the at least one microservice application to store the one or more preemptive computations until a given temporal period has expired. Additionally or alternatively, in at least one embodiment, performing the at least one automated action includes determining a resource property key value pertaining to the at least one predicted operation, at least one metadata key value pertaining to the at least one predicted operation, and a timestamp associated with the one or more preemptive computations.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to preemptively predict at least one operation to be requested in a given web API call using machine learning techniques. These and other embodiments can effectively overcome problems associated with latency in conventional web API call approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
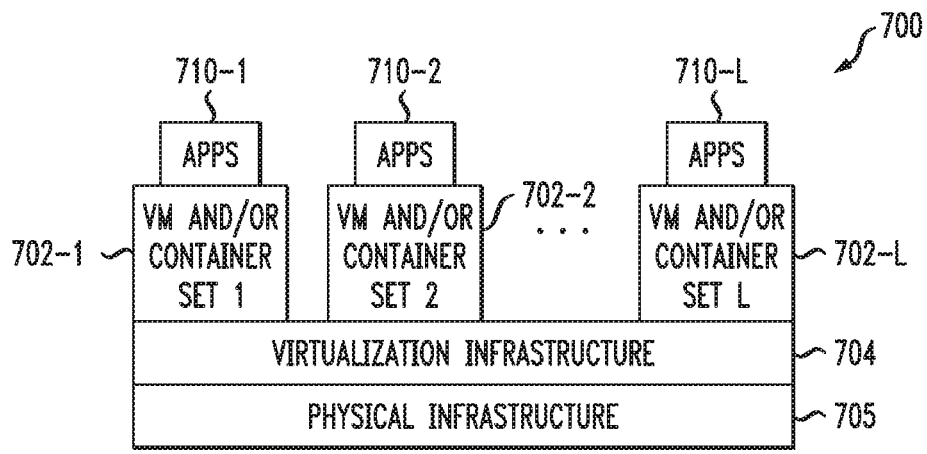
FIGS. 7 and 8 show examples of processing platforms that may be utilized to implement at least a portion of an information processing system in illustrative embodiments.
Figure 8:
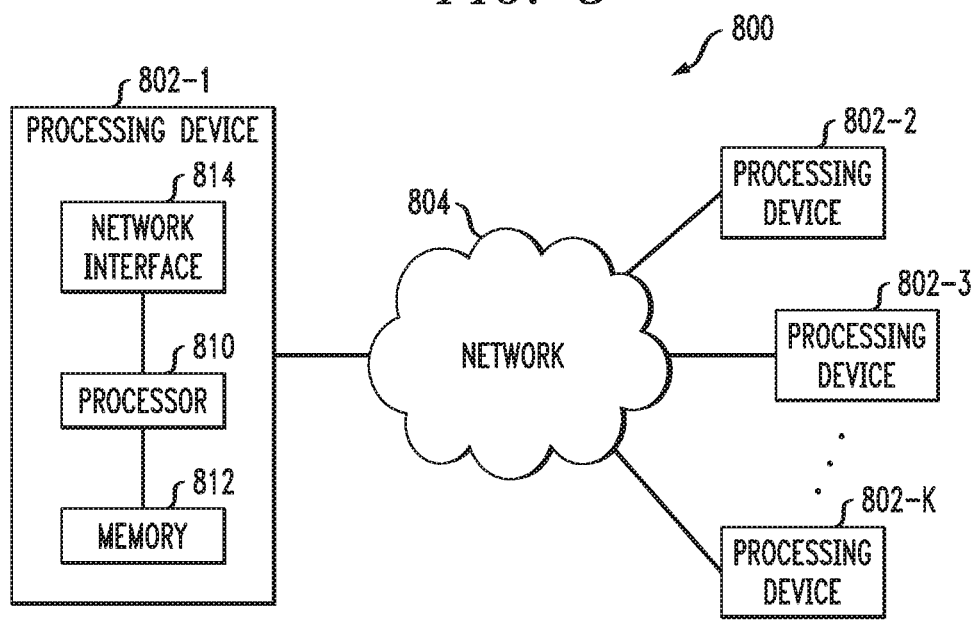

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining input data pertaining to one or more operations within one or more web application programming interface calls;
    predicting at least one operation to be requested in a given web application programming interface call by processing the input data and data pertaining to the given web application programming interface call using one or more machine learning techniques; and
    performing at least one automated action based at least in part on the at least one predicted operation, wherein performing the at least one automated action comprises:
        outputting at least one instruction to at least one microservice application to perform one or more preemptive computations pertaining to the at least one predicted operation and store results of the one or more preemptive computations, and wherein outputting the at least one instruction comprises generating at least one call to at least one internal web application programming interface endpoint of the at least one microservice application, using at least one internal route of the at least one microservice application, to perform the one or more preemptive computations; and
        validating the one or more preemptive computations based at least in part on comparing resource identifying information, associated with a resource corresponding to the at least one predicted operation and attributed to the one or more preemptive computations, to resource identifying information attributed to at least one prior instance of the at least one predicted operation involving the resource;
    wherein the method is performed by at least one processing device comprising a processor coupled to a memory.

2. The computer-implemented method of claim 1, wherein performing the at least one automated action comprises instructing the at least one microservice application to store the results of the one or more preemptive computations until a given temporal period has expired.

3. The computer-implemented method of claim 1, wherein performing the at least one automated action comprises determining a resource property key value pertaining to the at least one predicted operation, at least one metadata key value pertaining to the at least one predicted operation, and a timestamp associated with the one or more preemptive computations.

4. The computer-implemented method of claim 1, wherein the one or more machine learning techniques comprise one or more supervised learning classification algorithms.

5. The computer-implemented method of claim 4, wherein the one or more supervised learning classification algorithms comprise one or more of at least one random forest algorithm and at least one Gaussian naïve Bayes algorithm.

6. The computer-implemented method of claim 1, further comprising:
    training the one or more machine learning techniques using machine data logs.

7. The computer-implemented method of claim 6, wherein the training comprises organizing machine learning features using an N-dimension feature matrix, and wherein the machine learning features comprise time between operations in web application programming interface calls, user click interactions that are translated to web application programming interface call operation requests, user information, and application information.

8. The computer-implemented method of claim 1, wherein the input data comprise historical data pertaining to sequences of operation calls within the one or more web application programming interface calls.

9. The computer-implemented method of claim 8, wherein the historical data comprise information pertaining to at least one of operation types, timestamps, user identifiers, and resource identifiers.

10. A non-transitory processor-readable storage medium having stored therein program code of one or more software programs, wherein the program code when executed by at least one processing device causes the at least one processing device:
    to obtain input data pertaining to one or more operations within one or more web application programming interface calls;
    to predict at least one operation to be requested in a given web application programming interface call by processing the input data and data pertaining to the given web application programming interface call using one or more machine learning techniques; and to perform at least one automated action based at least in part on the at least one predicted operation, wherein performing the at least one automated action comprises:

outputting at least one instruction to at least one microservice application to perform one or more preemptive computations pertaining to the at least one predicted operation and store results of the one or more preemptive computations, and wherein outputting the at least one instruction comprises generating at least one call to at least one internal web application programming interface endpoint of the at least one microservice application, using at least one internal route of the at least one microservice application, to perform the one or more preemptive computations; and validating the one or more preemptive computations based at least in part on comparing resource identifying information, associated with a resource corresponding to the at least one predicted operation and attributed to the one or more preemptive computations, to resource identifying information attributed to at least one prior instance of the at least one predicted operation involving the resource.

11. The non-transitory processor-readable storage medium of claim 10, wherein performing the at least one automated action comprises instructing the at least one microservice application to store the results of the one or more preemptive computations until a given temporal period has expired.

12. The non-transitory processor-readable storage medium of claim 10, wherein performing the at least one automated action comprises determining a resource property key value pertaining to the at least one predicted operation, at least one metadata key value pertaining to the at least one predicted operation, and a timestamp associated with the one or more preemptive computations.

13. The non-transitory processor-readable storage medium of claim 10, wherein the one or more machine learning techniques comprise one or more supervised learning classification algorithms, and wherein the one or more supervised learning classification algorithms comprise one or more of at least one random forest algorithm and at least one Gaussian naïve Bayes algorithm.

14. An apparatus comprising:
    at least one processing device comprising a processor coupled to a memory;
    the at least one processing device being configured:
        to obtain input data pertaining to one or more operations within one or more web application programming interface calls;
        to predict at least one operation to be requested in a given web application programming interface call by processing the input data and data pertaining to the given web application programming interface call using one or more machine learning techniques; and
        to perform at least one automated action based at least in part on the at least one predicted operation, wherein performing the at least one automated action comprises:
            outputting at least one instruction to at least one microservice application to perform one or more preemptive computations pertaining to the at least one predicted operation and store results of the one or more preemptive computations, and wherein outputting the at least one instruction comprises generating at least one call to at least one internal web application programming interface endpoint of the at least one microservice application, using at least one internal route of the at least one microservice application, to perform the one or more preemptive computations; and
            validating the one or more preemptive computations based at least in part on comparing resource identifying information, associated with a resource corresponding to the at least one predicted operation and attributed to the one or more preemptive computations, to resource identifying information attributed to at least one prior instance of the at least one predicted operation involving the resource.

15. The apparatus of claim 14, wherein performing the at least one automated action comprises instructing the at least one microservice application to store the results of the one or more preemptive computations until a given temporal period has expired.

16. The apparatus of claim 14, wherein performing the at least one automated action comprises determining a resource property key value pertaining to the at least one predicted operation, at least one metadata key value pertaining to the at least one predicted operation, and a timestamp associated with the one or more preemptive computations.

17. The apparatus of claim 14, wherein the one or more machine learning techniques comprise one or more supervised learning classification algorithms, and wherein the one or more supervised learning classification algorithms comprise one or more of at least one random forest algorithm and at least one Gaussian naïve Bayes algorithm.

18. The apparatus of claim 14, wherein the at least one processing device is further configured:
    to train the one or more machine learning techniques using machine data logs.

19. The apparatus of claim 18, wherein the training comprises organizing machine learning features using an N-dimension feature matrix, and wherein the machine learning features comprise time between operations in web application programming interface calls, user click interactions that are translated to web application programming interface call operation requests, user information, and application information.

20. The apparatus of claim 14, wherein the input data comprise historical data pertaining to sequences of operation calls within the one or more web application programming interface calls.

* * * * *